US009309134B2

(12) United States Patent     (10) Patent No.: US 9,309,134 B2
Pastacaldi     (45) Date of Patent: Apr. 12, 2016

(54) METHOD FOR PURIFYING AQUEOUS COMPOSITIONS

(75) Inventor: Alessandra Pastacaldi, Rosignano Solvay-Livorno (IT)

(73) Assignee: SOLVAY (SOCIETE ANONYME), Brussels (BE)

( * ) Notice: Subject to any disclaimer, the term of this patent is extended or adjusted under 35 U.S.C. 154(b) by 420 days.

(21) Appl. No.: 12/937,984

(22) PCT Filed: Apr. 27, 2009

(86) PCT No.: PCT/EP2009/055073
§ 371 (c)(1),
(2), (4) Date: Oct. 14, 2010

(87) PCT Pub. No.: WO2009/133074
PCT Pub. Date: Nov. 5, 2009

(65) Prior Publication Data
US 2011/0031130 A1    Feb. 10, 2011

(30) Foreign Application Priority Data

Apr. 29, 2008 (FR) ..................................... 08 52897

(51) Int. Cl.
| | | |
|---|---|---|
| *B01D 21/00* | (2006.01) | |
| *B03D 3/00* | (2006.01) | |
| *C02F 1/52* | (2006.01) | |
| *C01B 7/00* | (2006.01) | |
| *C01B 33/26* | (2006.01) | |
| *C02F 1/60* | (2006.01) | |
| *C02F 1/68* | (2006.01) | |
| *C02F 1/00* | (2006.01) | |
| *B01D 37/00* | (2006.01) | |
| *C02F 1/66* | (2006.01) | |
| *C02F 9/00* | (2006.01) | |

(52) U.S. Cl.
CPC ................ *C02F 1/60* (2013.01); *C02F 1/5245* (2013.01); *C02F 1/66* (2013.01); *C02F 9/00* (2013.01); *C02F 2301/08* (2013.01)

(58) Field of Classification Search
CPC ............ C02F 1/52; C02F 1/5245; C02F 1/58; C02F 1/60; C02F 1/66; C02F 9/00; C02F 2103/08; C02F 2103/34; C02F 2209/06; C02F 2301/08; C02F 2303/22; C25B 1/26; C25B 1/34; C25B 1/46; B01D 21/01; C01B 33/26
See application file for complete search history.

(56) References Cited

U.S. PATENT DOCUMENTS

| | | | |
|---|---|---|---|
| 4,155,820 A | | 5/1979 | Ogawa et al. |
| 4,260,463 A | * | 4/1981 | Rideout ........................ 205/516 |
| 4,274,929 A | * | 6/1981 | Novak .......................... 205/536 |
| 4,450,057 A | * | 5/1984 | Kelly ............................. 205/536 |
| 4,966,764 A | * | 10/1990 | Reed et al. .................. 423/449.5 |
| 5,858,240 A | * | 1/1999 | Twardowski et al. .......... 210/652 |
| 6,080,298 A | | 6/2000 | Andolfatto |
| 6,471,871 B1 | * | 10/2002 | Pitzer ............................ 210/712 |
| 2004/0016705 A1 | * | 1/2004 | Umezawa et al. ............. 210/724 |
| 2005/0051488 A1 | * | 3/2005 | Nagghappan et al. ......... 210/652 |

FOREIGN PATENT DOCUMENTS

| | | | |
|---|---|---|---|
| CN | 1219610 A | 6/1999 | |
| CN | 1600702 A | 3/2005 | |
| EP | 0659686 A1 | 6/1995 | |
| JP | 62-11594 A | 1/1987 | |
| JP | S 55-114388 A | 9/1989 | |
| JP | 2005-334703 A | 12/2005 | |
| RU | 2315132 C2 | 4/2007 | |
| WO | WO 8202538 A1 | 8/1982 | |
| WO | WO 92/21618 A1 | 12/1992 | |
| WO | WO 9221618 A1 * | 12/1992 | ............... C02F 1/28 |
| WO | WO 9746305 A2 | 12/1997 | |
| WO | WO07065863 A1 | 6/2007 | |

OTHER PUBLICATIONS

U.S. Appl. No. 08/358,598, filed Dec. 14, 1994, A. Pastacaldi et al, Abandoned.
U.S. Appl. No. 12/094,848, filed May 23, 2008, A. Pasracaldi, Allowed on Sep. 23, 2008.
Ullmann's Encyclopedia of Industrial Chemistry, 2005, "pH Measurement and Control", Wiley VCH-Verlag GmbH & Co KGaA, Weinheim 10,1002/14356007,e19_e01, , pp. 1-31; 31 pgs.
L.S. Clesceri et al.(Eds.), "Standard Methods for the Examination of Water and Wastewater" , 20th Edition, 1998, United Book Press Inc, Baltimore, Maryland; 6 pgs.
Barbara Elvers et al (Eds.), Ullmann's Encyclopedia of Industrial Chemistry, 1993, vol. A23 : "Refractory Ceramics to Silicon Carbide" ; pp. 583-584; 614-629; 661; 708-711 ; 25 pgs.
Budavari, S. et al.,—"The Merck Index", 1989, An Encyclopedia of Chemicals, Drugs, and Biologicals, 11th Edition, pp. 57 and 1346; 3 pages.
Abdel-Wahab, A ., et al.,—"Chloride Removal from Recycled Cooling Water Using Ultra-High Lime with Aluminum Process", 2002, Water Environment Research, vol. 74, Issue No. 3, pp. 256-263; 8 pages.
Hamrouni, B., et al.—"Analytical aspects of silica in saline waters—application to desalination of brackish waters" 2001, Desalination, vol. 136, pp. 225-232; 8 pages.
Ritchie, G.S.P.,—"Role of Dissolution and Precipitation of Minerals in Controlling Soluble Aluminum in Acidic Soils", 1994, Advances in Agronomy, vol. 53, pp. 47-83; 37 pages.

(Continued)

*Primary Examiner* — Nam Nguyen
*Assistant Examiner* — Claire Perrin
(74) *Attorney, Agent, or Firm* — Jarrod N. Raphael

(57) ABSTRACT

Method for purifying an aqueous composition by removing silicon therefrom, according to which a compound comprising aluminum is added to the aqueous composition in order to obtain a molar aluminum content greater than the molar silicon content in said composition, the pH of the composition is controlled and maintained at a value higher than or equal to 8 and lower than or equal to 10, and the precipitate formed is separated from the aqueous suspension obtained.

22 Claims, No Drawings

(56) References Cited

OTHER PUBLICATIONS

Bénézeth, P. et al.,—"Solubility and reaction rates of aluminum solid phases under geothermal conditions", 2000, Proceedings World Geothermal Congress, Kyushu—Tohoku, Japan, May 28-Jun. 10, 2000; pp. 2533-2537; 5 pages.

Lur'ye, Y., —"Reference Manual of Analytical Chemistry" 1989, Moscow Khimiya, 6$^{th}$ Edition, 3 pages, includes translation in English.

[Unknown Author] Illustration of a diaphragm cell for electrolysis of a NaCl solution to make Cl2 and NaOH (1 pg.)—extracted online on Mar. 19, 2015 from http://www.eurochlor.org/the-chlorine-universe/how-is-chlorine-produced/the-diaphragm-cell-process.aspx.

[Unknown Author] Illustration of a membrane cell for electrolysis of a NaCl solution to make Cl2 and NaOH (1 pg.)—extracted online on Mar. 19, 2015 from http://www.eurochlor.org/the-chlorine-universe/how-is-chlorine-produced/the-membrane-cell-process.aspx.

[Unknown Author] Dupont, Nafion® Perfluorinated Membranes—User's Guide, Jan. 2000 (28 pg.)—extracted online on Mar. 19, 2015 from http://ion-power.com/German/oldsite/pdf/Nafion_06_01.pdf.

\* cited by examiner

METHOD FOR PURIFYING AQUEOUS COMPOSITIONS

CROSS-REFERENCE TO RELATED APPLICATIONS

The present application is a U.S. national stage application under 35 U.S.C. §371 of International Application No. PCT/EP2009/055073 filed Apr. 27, 2009, which claims priority to French patent application No. 08.52897, filed on Apr. 29, 2008, the whole content of such application being incorporated herein by reference for all purposes.

One subject of the invention is the purification of aqueous compositions, especially aqueous sodium chloride compositions.

It relates more particularly to a method for purifying aqueous compositions containing silicon.

The aqueous sodium chloride compositions obtained from sea water or by dissolving rock salt in water contain various impurities, especially including silicon, calcium, magnesium, iron, and also ammoniacal compounds (ammonia, ammonium chloride), iodo compounds (metal iodides) and bromo compounds (metal bromides). These impurities are often harmful, for example when sodium chloride compositions are treated in membrane electrolytic cells in order to produce chlorine and sodium hydroxide. In order to reduce the contents of these impurities, the aqueous sodium chloride compositions intended for membrane electrolysis are generally subjected to a first purification, during which sodium hydroxide and sodium carbonate are added to the solution, in order to precipitate out calcium and magnesium. However, these methods do not make it possible to obtain a satisfactory silicon removal. The presence of silicon in aqueous sodium chloride compositions has proved to also be a cause of loss of efficiency of cation exchange membrane electrolytic cells used for producing chlorine and aqueous sodium hydroxide solutions. This silicon originates from the presence, in salt deposits, of silicaceous rocks of $NaAlSiO_3O_8$ type. Silicon contents (expressed as $SiO_2$) greater than 10 ppm, or even 20 ppm, are common in the aqueous sodium chloride compositions resulting from the primary purification for removing calcium and magnesium. However, ion-exchange membrane producers in general require silicon contents below these values to ensure correct, lasting operation of their membranes.

More generally, excessive silicon contents in the wastewaters discharged by industrial processes are prohibited by numerous regulations.

It is known (see U.S. Pat. No. 4,450,057) to remove silicon from aqueous sodium chloride solutions that result from the purification that removes calcium and magnesium therefrom, by adjusting the pH to a value between 2 and 3 and then flowing the solution through a strong cationic chelating resin until the pH of the solution reaches, following this contact, a value above 5.5. However, it has emerged that, when this known process is used continuously over a long period, a prohibitive increase in the pressure drop is observed, caused by the passage of the aqueous solution through the resin, which greatly reduces the economic advantage of this known process when it is desired to obtain a sufficient silicon removal.

The invention aims to provide a method for removing silicon from aqueous compositions which is simple, economical and makes it possible to achieve excellent purification rates, in particular that makes it possible to satisfy the requirements of manufacturers of ion-exchange membranes that are, for example, used in the electrolysis of aqueous sodium chloride compositions.

Consequently, the invention relates, in a first embodiment, to a method for purifying an aqueous composition by removing silicon therefrom, in which aqueous composition the molar silicon content is higher than the aluminium content, the method comprising the following steps:
  (1) a compound comprising aluminium is added to the aqueous composition in order to obtain a molar aluminium content greater than the molar silicon content in said aqueous composition;
  (2) the pH of the composition obtained at step (1) is controlled and maintained at a value greater than or equal to 8 and lower than or equal to 10, in order to obtain a first precipitate;
  (3) the precipitate formed in the preceding step (2) is separated from the aqueous composition in order to obtain the purified aqueous composition.

In a first variant of the first embodiment, the purification method comprises in addition the following step:
  (2') the pH of the aqueous composition obtained at step (2) is controlled and maintained at a second value greater than or equal to 4 and lower than or equal to 7, in order to obtain a second precipitate;
and in step (3) the precipitates formed in the preceding steps (2) and (2') are separated from the aqueous composition in order to obtain the purified aqueous composition.

In a second variant of the first embodiment, the purification method comprises in addition the following steps:
  (4) the pH of the aqueous composition obtained at step (3) is controlled and maintained at a second value greater than or equal to 4 and lower than or equal to 7, in order to obtain a second precipitate;
  (5) the precipitate formed in the preceding step (4) is separated from the aqueous composition in order to obtain the purified aqueous composition.

The aqueous composition to be purified can be an aqueous solution or an aqueous suspension. The aqueous composition is preferably an aqueous solution, i.e an homogeneous mixture of water and of the other components.

The silicon present in the aqueous composition to be purified is preferably present as one or more soluble compounds, preferably inorganic compounds, containing silicon. Such soluble inorganic compounds containing silicon will be referred as soluble silica. Non limiting examples of such compounds are $Si(OH)_4$, dimers and oligomers thereof, and silicates.

In the purification method according to the invention, the precipitates obtained at steps (2) and/or (2') and/or (4) generally contain at least silicon and aluminium. Those precipitates contain preferably at least silicon and aluminium, and more preferably at least one aluminosilicate.

The method according to the invention is suited to the removal of silicon from an aqueous composition containing, as a molar content, a larger amount of silicon than of aluminium. It is not however necessary for it to contain aluminium. Aluminium is a substance likened to heavy metals and considered to be harmful to the environment. In the case where the aqueous solution subjected to the treatment is used in membrane electrolysis, aluminium is also harmful to the operation of the membranes.

Very surprisingly, although aluminium is added to the aqueous composition, the method according to the invention makes it possible to obtain a composition that is purified both of silicon and of aluminium. Without wishing to be committed to one theoretical explanation, the inventors believe that this fact is due to the wide variety of aluminosilicates that it is possible to precipitate and separate from the aqueous composition. This variety makes it possible to adapt the treatment to various stoichiometric aluminium/silicon ratios.

According to the invention, aluminium is added to the aqueous composition in order to obtain a molar aluminium content greater than the molar silicon content.

These contents are generally based on the aluminium and silicon contents of the aqueous composition before its treatment. The aluminium and silicon contents of the aqueous composition before its treatment can be known, for instance from the origin of the aqueous composition to be purify, or they can be measured.

In a preferred aspect of the purification method according to the invention, the molar contents of silicon and aluminium in the aqueous composition to be purified are measured, prior to step (1).

The molar silicon contents are deduced from measurements of the soluble silica contents, advantageously measured by a colorimetric method based on the following reactions: soluble silica forms with ammonium molybdate $((NH_4)_6Mo_7O_{22}.4H_2O)$ a complex which, after reaction with Mohr's salt $(Fe(NH_4)_2(SO_4)_2.6H_2O)$, forms a blue complex. The aluminium contents are themselves advantageously measured according to the plasma spectrophotometry method, as described in "Standard Methods for the Examination of Water and Wastewater" (L. S. Clescerl, A. E. Greenberg, A. D. Eaton, $15^{th}$ Edition).

The addition of the compound containing aluminium may be made in any form and according to any procedure suited to the aqueous composition to be purified. When the aqueous composition is a sodium chloride composition intended for membrane electrolysis, it is recommended that the aluminium is added in the form of $AlCl_3.6H_2O$. The pH of the composition to be purified before the addition of the compound containing aluminium is not critical. However, it is recommended that, before the addition of the aluminium, the pH of the aqueous composition is adjusted if necessary, maintained and controlled at a value higher than or equal to 1.5 and preferably higher than or equal to 2. This pH is preferably lower than or equal to 3.5 and more preferably lower than or equal to 3. These pH ranges are particularly recommended when the aqueous composition is a sodium chloride composition intended for membrane electrolysis. Without wishing to be committed to one theoretical explanation, the inventors believe that within such pH range, the aluminium compound will dissolve in the aqueous composition to be purified, the aluminium being then available for the formation of aluminosilicates, while outside such pH ranges precipitation of aluminium may occur before any combination with silicon. In general, a controlled amount of a suitable acid is added, for this purpose, to the aqueous composition to be purified, for example hydrochloric acid when the solution to be purified is an aqueous sodium chloride composition.

In one advantageous variant of the method according to the invention, aluminium is added to the aqueous composition so as to obtain a molar aluminium content that is equal to at least 2 times, preferably 2.5 times, the molar silicon content.

The addition of the compound comprising aluminium is preferably carried out in a controlled manner. By controlled manner, it is meant that the addition is carried out in order to reach the desired Al/Si molar ratio in the aqueous composition to be purified.

After the addition of the required amount of aluminium, the pH of the composition is adjusted if necessary, maintained and controlled at a value greater than or equal to 8 and preferably greater than or equal to 8.5. This pH is lower than or equal to 10, preferably lower than or equal to 9.5. Generally, a controlled amount of a suitable base is added, for this purpose, to the aqueous composition to be purified, for example sodium hydroxide in the case of a sodium chloride solution. In this pH range, owing to the provision of aluminium made in accordance with the invention, a first precipitate is obtained. That precipitate contains generally at least silicon and aluminium, preferably at least silicon and aluminium, and more preferably at least one aluminosilicate. Most preferably, that first precipitate consists of aluminosilicates.

It is recommended to control and maintain the pH within this range of values for at time long enough to ensure that the precipitation is as complete as possible. This time is generally higher than or equal to 1 min, preferably higher than or equal to 5 min, more preferably higher than or equal to 10 min, and most preferably higher than or equal to 20 min. This time is usually lower than or equal to 10 h, preferably lower than or equal to 5 h, more preferably lower than or equal to 2 h, and most preferably lower than or equal to 1 h. A time of about 0.5 h is particularly convenient.

According to the invention, a supplementary modification of the pH may then be carried out (steps (2') and (4) of the first and second variants of the first embodiment). The pH may be further adjusted, maintained and controlled at a value usually higher than or equal to 4 and preferably higher than or equal to 4.5. This pH is usually lower than or equal to 7, and preferably lower than or equal to 6. This supplementary modification of pH is preferably carried out. At these pH values, a second precipitate is usually obtained. That second precipitate contains usually at least aluminium, preferably at least silicon and aluminium, and more preferably at least one aluminosilicate. Most preferably, that second precipitate comprises aluminosilicates and, where appropriate, aluminium hydroxide when the composition contains an excess of aluminium, which completes the removal of silicon and aluminium that were dissolved in the aqueous composition.

In order to maintain the pH in a given range, the pH is measured and adjusted if necessary.

The pH measurement can be done either continuously or periodically. In this last case, the measurement is usually carried out at a frequency sufficiently high to maintain the pH in the set range during at least 80% of the duration of the step, often during at least 90%, frequently during at least 95% and in particular during at least 99%.

The pH measurement can be carried out "in situ" in the composition or "ex situ" in a sample withdrawn from the composition and brought to an adequate temperature and an adequate pressure to assure a good longevity to the pH measurement equipment. A temperature 25° C. and a pressure of 1 bar are examples of adequate temperature and pressure.

The pH measurement can be carried out by any means. Measurement with a pH sensitive electrode is convenient. Such an electrode should be stable in the composition under the step conditions and should not contaminate the composition. Glass electrodes for measuring pH are more particularly convenient. Examples of such electrodes are given in Ullmann's Encyclopedia of Industrial Chemistry,© 2005, Wiley-VCH Verlag GmbH & Co. KGaA, Weinheim 10.1002/14356007.e19_e01, pp. 8-15. Electrodes of the type 405-DPAS-SC-K85 supplied by METTLER TOLEDO® or of the types Ceragel CPS71 and Orbisint CPS11 supplied by ENDRESS+HAUSER® are examples of electrodes that can be used.

The pH can be adjusted and maintained at said values either by addition of an acidic compound or by addition of a basic compound. Any acidic or basic compounds can be used to maintain the pH. Inorganic acids and inorganic bases are preferred. Hydrogen chloride, gaseous and/or in aqueous solution, is a more preferred acidic compound. Sodium hydroxide, solids and/or in aqueous solution and/or suspensions, is a more preferred basic compound, with sodium hydroxide aqueous solutions being most preferred.

The adjustment can be carried out in an automated or in a non-automated mode. It is preferred to use an automated mode wherein the control of the pH is exerted by a closed circuit known as control loop. Such control loops are described in Ullmann's Encyclopedia of Industrial Chemistry,© 2005, Wiley-VCH Verlag GmbH & Co. KGaA, Weinheim 10.1002/14356007.e19_e01, pp. 24-27. A PROMINENT® DULCOMETER® system type PHD is an example of an automated pH control and adjustment apparatus that can be used.

The precipitates formed during steps (2) and/or (2') and/or (4) must be separated from the aqueous compositions in order to obtain the desired purified composition.

The separation can be carried out by any separation treatment. The separation treatment is usually selected from the group consisting of decantation, filtration, centrifugation and any combination of at least two of them. A separation treatment by filtration is preferred.

The treatment by filtration is usually carried out by using a filter that has a cut-off diameter of less than 1 μm. Any particle having a size above 1 μm is then separated from the aqueous suspension. The cut-off diameter is preferably less than 0.75 μm, more preferably less than 0.5 μm.

In order to effectively separate the precipitates, in one recommended variant of the method according to the invention, the aqueous suspension obtained at the end of steps (2) and (2') is filtered using a filter that has a cut-off diameter of less than 1 μm. Any particle having a size above 1 μm is then separated from the aqueous suspension. The cut-off diameter is preferably less than 0.75 μm, more preferably less than 0.5 μm.

The various steps of the purification method are independently carried out at a temperature generally higher than or equal to −10° C., frequently higher than or equal to 0° C., often higher than or equal to 10° C. and specifically higher than or equal to 20° C. That temperature is generally lower than or equal to 100° C., frequently lower than or equal to 80° C., often lower than or equal to 60° C. and specifically lower than or equal to 30° C. A temperature of about 25° C. is particularly convenient.

The various steps of the purification method are independently carried out at a pressure generally higher than or equal to 0.1 bar absolute, frequently higher than or equal to 0.5 bar, often higher than or equal to 0.8 bar and specifically higher than or equal to 0.9 bar. That pressure is generally lower than or equal to 10 bar, frequently lower than or equal to 5, often lower than or equal to 2 bar and specifically lower than or equal to 1.5 bar. A pressure of about 1 bar absolute is particularly convenient.

In the purification method according to the invention, the steps can be carried out in one or more zones. These zones can be operated under any type of regime, like for instance, mixed regime, preferably perfectly mixed regime or plug flow regime. The mixed regime is preferred.

The various steps of the purification method according to the invention can be carried out independently in a discontinuous, continuous or semi-continuous mode. The continuous mode is preferred. All the steps of the purification method according to the invention are more preferably carried out in a continuous mode.

By continuous mode, one intends to denote a mode wherein the aqueous composition to be purified, the added compounds, among which the compound comprising aluminium, the acidic and basic compounds for adjusting and maintaining the pH, and the treated aqueous composition, among which the aqueous compositions comprising the precipitates, are continuously fed and removed from the zones where the various steps are carried out. By discontinuous mode, one intends to denote any other mode. The semi-continuous mode can be considered as a discontinuous mode. By the term continuously, one intends to denote without substantial interruption.

When the various steps of the purification method are carried out under discontinuous mode, they are independently carried out for a duration generally higher than or equal to 1 min absolute, frequently higher than or equal to 5 min, often higher than or equal to 10 min and specifically higher than or equal to 20 min. That duration is generally lower than or equal to 10 h, often lower than or equal to 5 h, frequently lower than 2 h, and in particular lower than or equal to 1 h. A duration of about 0.5 h is convenient.

When the various steps of the purification method are carried out under continuous mode, they are independently and generally carried out for a residence time generally higher than or equal to 1 min absolute, frequently higher than or equal to 5 min, often higher than or equal to 10 min and specifically higher than or equal to 20 min. That residence time is generally lower than or equal to 10 h, often lower than or equal to 5 h, frequently lower than 2 h, and in particular lower than or equal to 1 h. A residence time of about 0.5 h is convenient. That time can be defined by the ratio between the volume of the zone where the step is carried and the flow of the aqueous composition to the zone where the step is carried out.

The method according to the invention is suited to the purification of numerous aqueous compositions contaminated with silicon comprising a larger molar amount of silicon than aluminium. It is especially suited to the purification of aqueous compositions comprising at least 5 ppm, preferably at least 10 ppm, of soluble silica (expressed as $SiO_2$). It is also suited to aqueous compositions advantageously comprising less than 5 ppm of aluminium, preferably less than 1 ppm.

The method according to the invention is particularly well suited to the purification of numerous aqueous solutions contaminated with silicon comprising a larger molar amount of silicon than aluminium. It is especially suited to the purification of aqueous solution comprising at least 5 ppm, preferably at least 10 ppm, of soluble silica (expressed as $SiO_2$). It is also suited to aqueous compositions advantageously comprising less than 5 ppm of aluminium, preferably less than 1 ppm.

In one implementation variant of the method according to the invention, the aqueous composition to be purified is an aqueous sodium chloride solution, intended for membrane electrolysis. In this variant, it is advantageous for the purification to be such that the soluble silica content of the purified solution (expressed as $SiO_2$) is less than 3 ppm, preferably less than 2 ppm. In that way, a lasting and efficient operation of the ion-exchange membranes of the electrolyzer is obtained.

In one preferred aspect of this variant, the aqueous solution to be purified results from a primary purification for removing calcium and magnesium. Such a primary purification is obtained in a known manner by addition of sodium carbonate and sodium hydroxide, then separation of the calcium carbonate and magnesium hydroxide precipitates formed. It is recommended that the total content of calcium and magnesium in the aqueous solution resulting from the primary purification is less than 500 ppm. In this embodiment, the purified solution resulting from the method according to the invention is then subjected to a super-purification for removal of calcium and magnesium, for example using ion-exchange resins.

The high purity of the sodium chloride solutions obtained in this embodiment makes it possible to produce, under stable conditions and by membrane electrolysis, sodium hydroxide and chlorine that satisfy the strictest quality requirements.

Consequently, the invention relates in a second embodiment to a method for producing chlorine and sodium hydroxide, according to which an aqueous sodium chloride solution obtained by the method according to the invention is subjected to electrolysis using a membrane cell that is selectively permeable to the ions.

Distinctive features and details of the invention will emerge from the following examples.

EXAMPLE 1

Not Conforming to the Invention

An aqueous sodium chloride solution was taken which resulted from the dissolution in water of sodium chloride originating from a deposit. Hydrochloric acid was added, with moderate stirring and at a temperature of 25° C., until a pH of 2 was obtained. The soluble silica content of the solution expressed as $SiO_2$, measured by colorimetry, was equal to 12 ppm by weight of brine. Aluminium was then added in the form of a solution of $AlCl_3.6H_2O$ containing 1 g/l Al, until a molar aluminium content equal to 0.3 times that of silicon, namely around 2 ppm by weight, was obtained. The pH was then adjusted to the value 9, by addition of NaOH. The suspension obtained was then filtered for 3 h using a Millipore filter having a cut-off diameter of 0.45 μm. The soluble silica content of the aqueous solution obtained was equal to 4 ppm, whilst that of aluminium was equal to 1 ppm.

EXAMPLE 2

According to the Invention

The procedure as in Example 1 was followed, except that aluminium was added until a molar aluminium content equaling approximately 2 times that of silicon was obtained. The weight contents of soluble silica expressed as $SiO_2$ and aluminium were then equal to 9.4 and 11.8 ppm, respectively. The pH was altered to a value close to 5.5. The solution was then filtered. After filtering for 2 hours, the soluble silica content was 1.6 ppm, whilst that of aluminium was less than 1 ppm.

EXAMPLE 3

Not Conforming to the Invention

The procedure as in Example 1 was followed, except that magnesium was added instead of aluminium. The amount added was adjusted to obtain a molar magnesium content equaling 1.1 times that of silicon. The soluble silica content expressed as $SiO_2$ was equal to 20 ppm. After filtering for 4 hours, the soluble silica content was still 16 ppm, whilst that of magnesium was 0.9 ppm.

The invention claimed is:
1. A method for producing chlorine and sodium hydroxide comprising the following steps:
(A) purifying an aqueous sodium chloride composition by removing silicon therefrom, in which the aqueous sodium chloride composition has a molar silicon content higher than a molar aluminum content, said purifying comprising the following steps:
(1) adding a compound comprising aluminum to the aqueous sodium chloride composition, in order to obtain a molar aluminum content which is greater than the molar silicon content in said aqueous sodium chloride composition;
(2) controlling and maintaining the pH of said aqueous sodium chloride composition obtained from step (1) at a first value greater than or equal to 8 and lower than or equal to 10, in order to obtain a first precipitate comprising at least silicon and aluminum; and
(2') controlling and maintaining the pH of the aqueous sodium chloride composition obtained from said step (2) at a second value greater than or equal to 4 and lower than or equal to 7, in order to obtain a second precipitate comprising at least aluminum; and
(3) separating said first precipitate obtained from said step (2) and said second precipitate obtained from said step (2') from the aqueous sodium chloride composition in order to obtain a purified aqueous sodium chloride composition,
and
(B) subjecting said purified aqueous sodium chloride composition to electrolysis using a membrane cell that is selectively permeable to ions, to produce chlorine and sodium hydroxide.

2. The method according to claim 1, wherein at least one of said first precipitate obtained from step (2) and said second precipitate obtained from step (2') comprises at least one aluminosilicate.

3. The method according to claim 1, wherein the silicon in the aqueous sodium chloride composition is present as one or more soluble inorganic compounds containing silicon.

4. The method according to claim 1, wherein the pH in step (2) is maintained and controlled at a value greater than or equal to 8.5 and lower than or equal to 9.5.

5. The method according to claim 1, wherein the pH in step (2') is maintained and controlled at a value greater than or equal to 4.5 and lower than or equal to 6.

6. The method according to claim 1, wherein before step (2), the pH is maintained and controlled at a value greater than or equal to 1.5 and lower than or equal to 3.5.

7. The method according to claim 1, wherein the molar aluminum content in the aqueous sodium chloride composition obtained at the end of step (1) is equal to at least 2 times the molar silicon content.

8. The method according to claim 1, wherein at least one of said first precipitate obtained from step (2) and said second precipitate obtained from step (2') is separated by a separation treatment independently selected from the group consisting of decantation, filtration, centrifugation, and combinations thereof.

9. The method according to claim 1, wherein the aqueous sodium chloride composition is an aqueous sodium chloride solution.

10. The method according to claim 9, wherein the aqueous sodium chloride solution is obtained from a primary purification for removing calcium and magnesium.

11. A method for producing chlorine and sodium hydroxide comprising the following steps:
(A) purifying an aqueous sodium chloride composition by removing silicon therefrom, in which the aqueous sodium chloride composition has a molar silicon content higher than a molar aluminum content, said purifying comprising the following steps:

(1) adding a compound comprising aluminum to the aqueous sodium chloride composition, in order to obtain a molar aluminum content which is greater than the molar silicon content in said aqueous sodium chloride composition;

(2) controlling and maintaining the pH of said aqueous sodium chloride composition obtained from said step (1) at a first value greater than or equal to 8 and lower than or equal to 10, in order to obtain a first precipitate comprising at least silicon and aluminum; and (3) separating the first precipitate obtained from said step (2) from the aqueous sodium chloride composition in order to obtain a purified aqueous sodium chloride composition;

(4) controlling and maintaining the pH of the aqueous sodium chloride composition obtained from step (3) at a second value greater than or equal to 4 and lower than or equal to 7, in order to obtain a second precipitate comprising at least aluminum; and (5) separating said second precipitate from said step (4) from the aqueous sodium chloride composition in order to obtain a purified aqueous sodium chloride composition, and (B) subjecting said purified aqueous sodium chloride composition to electrolysis using a membrane cell that is selectively permeable to ions, to produce chlorine and sodium hydroxide.

12. The method according to claim 11 wherein the aqueous sodium chloride composition is an aqueous sodium chloride solution.

13. The method according to claim 12, wherein the aqueous sodium chloride solution is obtained from a primary purification for removing calcium and magnesium.

14. The method according to claim 11, wherein at least one of said first precipitate obtained from said step (2) and said second precipitate obtained from said step (4) comprise at least one aluminosilicate.

15. The method according to claim 11, wherein, in said step (4), the pH is maintained and controlled at a value greater than or equal to 4.5 and lower than or equal to 6.

16. The method according to claim 11, wherein at least one of said first precipitate obtained from said step (2) and said second precipitate obtained from said step (4) is separated by a separation treatment independently selected from the group consisting of decantation, filtration, centrifugation, and combinations thereof.

17. The method according to claim 11, wherein the silicon in the aqueous sodium chloride composition is present as one or more soluble inorganic compounds containing silicon.

18. The method according to claim 11 wherein the pH in step (2) is maintained and controlled at a value greater than or equal to 8.5 and lower than or equal to 9.5.

19. The method according to claim 11, wherein before step (2), the pH is maintained and controlled at a value greater than or equal to 1.5 and lower than or equal to 3.5.

20. The method according to claim 11, wherein the molar aluminum content in the aqueous sodium chloride composition obtained at the end of step (1) is equal to at least 2 times the molar silicon content.

21. A method for purifying an aqueous sodium chloride composition by removing silicon therefrom, in which the aqueous sodium chloride composition has a molar silicon content higher than a molar aluminum content, the method comprising the following steps:

(1) adding a compound comprising aluminum to the aqueous sodium chloride composition, in order to obtain a molar aluminum content which is greater than the molar silicon content in said aqueous sodium chloride composition;

(2) controlling and maintaining the pH of said aqueous sodium chloride composition obtained from step (1) at a first value greater than or equal to 8 and lower than or equal to 10, in order to obtain a first precipitate comprising at least silicon and aluminum; and (2') controlling and maintaining the pH of the aqueous sodium chloride composition obtained from said step (2) at a second value greater than or equal to 4 and lower than or equal to 7, in order to obtain a second precipitate comprising at least aluminum; and (3) separating said first precipitate obtained from said step (2) and said second precipitate obtained from said step (2') from the aqueous sodium chloride composition in order to obtain a purified aqueous sodium chloride composition, and wherein before step (2), the pH is maintained and controlled at a value greater than or equal to 1.5 and lower than or equal to 3.5 in order to allow said compound comprising aluminum to be dissolved in said aqueous sodium chloride composition.

22. A method for purifying an aqueous sodium chloride composition by removing silicon therefrom, in which the aqueous sodium chloride composition has a molar silicon content higher than a molar aluminum content, the method comprising the following steps:

(1) adding a compound comprising aluminum to the aqueous sodium chloride composition, in order to obtain a molar aluminum content which is greater than the molar silicon content in said aqueous sodium chloride composition;

(2) controlling and maintaining the pH of said aqueous composition obtained from said step (1) at a first value greater than or equal to 8 and lower than or equal to 10, in order to obtain a first precipitate comprising at least silicon and aluminum; and (3) separating the first precipitate obtained from said step (2) from the aqueous sodium chloride composition in order to obtain a purified aqueous sodium chloride composition;

(4) controlling and maintaining the pH of the aqueous sodium chloride composition obtained from step (3) at a second value greater than or equal to 4 and lower than or equal to 7, in order to obtain a second precipitate comprising at least aluminum; and (5) separating said second precipitate from said step (4) from the aqueous sodium chloride composition in order to obtain a purified aqueous sodium chloride composition, and wherein before step (2), the pH is maintained and controlled at a value greater than or equal to 1.5 and lower than or equal to 3.5 in order to allow said compound comprising aluminum to be dissolved in said aqueous sodium chloride composition.

* * * * *